United States Patent
Park et al.

(10) Patent No.: US 10,864,807 B2
(45) Date of Patent: Dec. 15, 2020

(54) BIDIRECTIONALLY OPEN SUNROOF STRUCTURE

(71) Applicants: HYUNDAI MOTOR COMPANY, Seoul (KR); KIA MOTORS CORPORATION, Seoul (KR)

(72) Inventors: Jae Han Park, Suwon-si (KR); Jeong Min Lee, Busan (KR); Jae Kyu Lee, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/401,920

(22) Filed: May 2, 2019

(65) Prior Publication Data

US 2020/0180410 A1 Jun. 11, 2020

(30) Foreign Application Priority Data

Dec. 11, 2018 (KR) ........................ 10-2018-0158782

(51) Int. Cl.
*B60J 7/043* (2006.01)
*B60J 7/057* (2006.01)

(52) U.S. Cl.
CPC ........... *B60J 7/0435* (2013.01); *B60J 7/0573* (2013.01); *E05Y 2900/542* (2013.01)

(58) Field of Classification Search
CPC ................. B60J 7/0435; E05Y 2900/542

USPC ............ 296/216.02–216.05, 216.08, 220.01
See application file for complete search history.

(56) References Cited

U.S. PATENT DOCUMENTS

| | | | | |
|---|---|---|---|---|
| 6,443,520 B1 * | 9/2002 | Schmaelzle | ................ | B60J 7/04 296/216.03 |
| 6,805,402 B2 * | 10/2004 | Pfalzgraf | ................. | B60J 7/047 296/217 |
| 9,752,365 B2 * | 9/2017 | Park | .................... | E05D 15/0608 |

FOREIGN PATENT DOCUMENTS

KR 10-1372094 B1 3/2014

* cited by examiner

*Primary Examiner* — Dennis H Pedder
(74) *Attorney, Agent, or Firm* — McDonnell Boehnen Hulbert & Berghoff LLP

(57) ABSTRACT

A bidirectionally open sunroof structure includes rail assemblies installed at both sides of a roof panel, a front tilt lever connected to a front glass and the rail assembly and located at a front part of the front glass, a rear tilt lever connected to the front glass and the rail assembly and located at a rear part of the front glass, a front sled located on the front glass and driven by a driving motor to slidably reciprocate along the rail assemblies, and a rear sled located on a rear glass and driven by a driving motor to slidably reciprocate along the rail assemblies. The rail assembly includes a first guide rail configured to slidably move the front sled therealong, and a second guide rail located within the first guide rail and configured to slidably move the rear sled therealong.

5 Claims, 6 Drawing Sheets

[ Section E ]

[ Section A ]

[ Section B ]

[ Section C ]

[ Section D ]

[ Section E ]

BIDIRECTIONALLY OPEN SUNROOF STRUCTURE

CROSS REFERENCE TO RELATED APPLICATION

This application claims under 35 U.S.C. § 119(a) the benefit of priority to Korean Patent Application No. 10-2018-0158782 filed on Dec. 11, 2018, the entire contents of which are incorporated herein by reference.

BACKGROUND

(a) Technical Field

The present disclosure relates to a bidirectionally open sunroof structure. More particularly, it relates to a bidirectionally open sunroof structure which provides rail assemblies so that a front glass and a rear glass are slidably moved therealong in a front and rear direction and may thus be bidirectionally open.

(b) Background Art

In general, a sunroof serving as a unit to achieve inner ventilation and provide a sense of openness tends to be installed in many vehicles now.

Such a sunroof is generally manufactured through heat treatment so as to withstand strong sunlight and is formed of glass so as to effectively block ultraviolet light and infrared light.

Sunroofs are generally operated in a full opening type, or in a partially opening type in which only a rear part of a sunroof is slightly lifted up to circulate air under the condition that the sunroof is not completely opened.

Further, a panoramic sunroof in which the greater part of a roof panel is formed of glass in addition to a front part of a vehicle to maximize a sense of openness and thus a driver and passengers may feel as though they are riding in a convertible has become popular recently.

That is, the panoramic sunroof has a structure in which most of the area of a vehicle roof panel is open and the entirety of the sunroof is covered with glass, and, when the glass is open, the entire sunroof is open so that the driver feels a sense of openness.

In such a panoramic sunroof, the glass is operated in a tilted open method or a sliding open method according to a mechanism structure thereof.

Particularly, if the glass of the panoramic sunroof is operated in the tilted open method, a support structure of a moving glass will be described below.

FIGS. 1 and 2 are a plan view and a cross-sectional view taken along line A-A illustrating a support mechanism structure of a conventional moving glass operated in a tilted open method. Support points of the mechanism are located at a front part and a central part of the moving glass 1 under the condition that the moving glass 1 is in a closed state, and a rear end part of the moving glass 1 is tilted at a designated angle while moving in an up and down direction and thus the moving glass 1 is opened or closed.

However, in the above mechanism structure, only the moving glass 1 located at the front region of a roof panel is slidably moved rearwards and thus does not provide a sense of openness to passengers in a rear seat.

SUMMARY

The present disclosure has been made in an effort to solve the above-described problems associated with the prior art and it is an object of the present disclosure to provide a bidirectionally open sunroof structure which may provide a sense of openness not only to passengers in a front seat but also to passengers in a rear seat.

It is another object of the present disclosure to provide a bidirectionally open sunroof structure which may provide rail assemblies to prevent interference between a front glass and a rear glass.

It is yet another object of the present disclosure to provide a bidirectionally open sunroof structure which may slidably move respective glasses along rail assemblies.

In one aspect, the present disclosure provides a bidirectionally open sunroof structure including rail assemblies installed at both sides of a roof panel of a vehicle, a front tilt lever connected to a front glass and the rail assembly and located at a front part of the front glass, a rear tilt lever connected to the front glass and the rail assembly and located at a rear part of the front glass, a front sled located on the front glass and driven by a driving motor to slidably reciprocate along the rail assemblies, and a rear sled located on a rear glass and driven by a driving motor to slidably reciprocate along the rail assemblies, wherein the rail assembly includes a first guide rail configured to slidably move the front sled therealong, and a second guide rail located within the first guide rail and configured to slidably move the rear sled therealong.

In a preferred embodiment, the bidirectionally open sunroof structure may further include a stopper located on the front sled to prevent the rear sled from moving farther forward than the front sled.

In another preferred embodiment, in order to move the front glass rearwards, the rear tilt lever and the front tilt lever may raise the front glass.

In still another preferred embodiment, the rear glass may be configured to be inserted into the front glass along the rear sled and to be moved in a front and rear direction of the vehicle.

In yet another preferred embodiment, the bidirectionally open sunroof structure may further include a lowering lever configured to lower the rear glass, when the rear glass is moved forwards.

In still yet another preferred embodiment, the front sled may include a first insert part configured to be inserted into at least one side surface of the first guide rail, a first carriage configured to fix the front glass, and a blocking part configured to prevent dust from being introduced into the bidirectionally open sunroof structure.

In a further preferred embodiment, the rear sled may include second insert parts configured to be inserted into the second guide rail, and a second carriage configured to fix the rear glass.

In another further preferred embodiment, at least one of the front tilt lever or the rear tilt lever may be interlocked with the front sled.

Other aspects and preferred embodiments of the disclosure are discussed infra.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
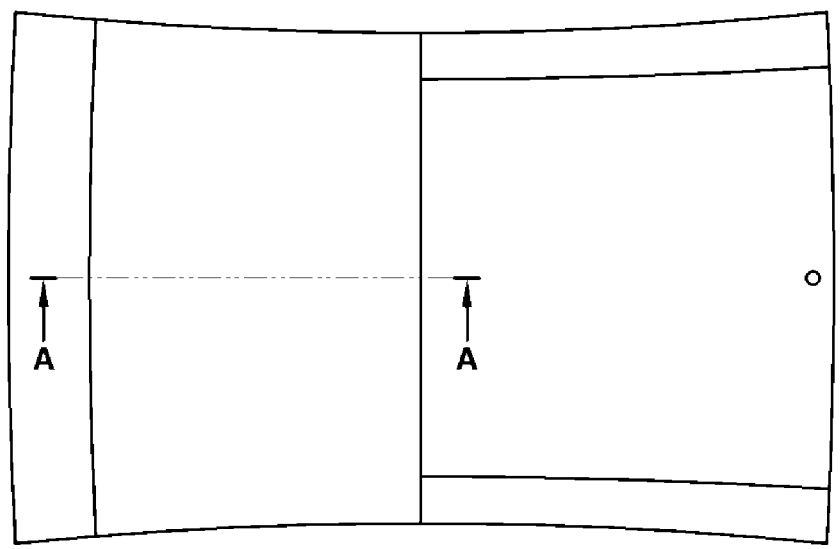
FIG. 1 is a front view of a conventional panoramic sunroof.
Figure 2:
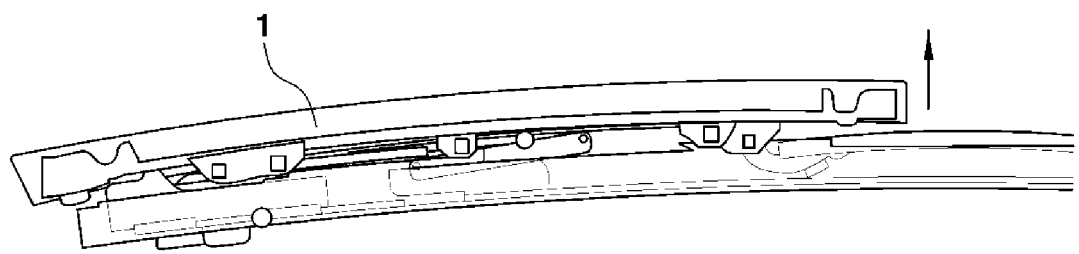
FIG. 2 is a side view of the conventional panoramic sunroof in a tilted state.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the invention is intended to cover not only the exemplary embodiments, but also various alternatives, modifications, equivalents and other embodiments within the spirit and scope of the disclosure as defined by the appended claims.

In the following description, it will be understood that terms, such as "part", "assembly", "~sled", "~lever", etc., mean units to process at least one function or operation, and they may be implemented as hardware or a combination of hardware.

In addition, in the following description, it will be understood that terms, such as "first", "second", etc., are used only to distinguish elements having the same name from each other and do not limit their sequence.

Also, in the following description, it will be understood that terms, such as "front", "rear", etc., are used only to distinguish elements having the same name from each other.

In the following description, the term "front" refers to an element located close to a front region of a vehicle, the term "rear" refers to an element located close to a rear region of the vehicle, and these terms are used only to distinguish elements having the same name from each other.

Further, in the following description, it will be understood that expressions, such as "raise" and "lower", mean a change in height in a height direction of the vehicle.

In addition, in the following description, it will be understood that an element referred to as a "sunroof" includes all elements open in a roof space.

The present disclosure relates to a bidirectionally open sunroof structure 100 configured such that a front glass 110 and a rear glass 120 are selectively opened.

FIGS. 3A to 3E are front and cross-sectional views of the bidirectionally open sunroof structure 100 in accordance with the present disclosure in a closed state.

As exemplarily shown in these figures, the bidirectionally open sunroof structure 100 in accordance with the present disclosure includes the front glass 110 and the rear glass 120, and is located on rail assemblies 130 installed at both sides of a roof panel of a vehicle. The rail assembly 130 includes a first guide rail 131 on which the front glass 110 is located through a front sled 160 and a second guide rail 132 on which the rear glass 120 is located through a rear sled 170.

The front glass 110 includes a rear tilt lever 140 configured to be tilted according to user's request, and a front tilt lever 150 configured to be slid to a rear region of the vehicle so that the front glass 110 is open. Therefore, the rear tilt lever 140 is configured to raise one end of a rear surface of the front glass 110 according to a tilting mode of the sunroof structure 100, the rear tilt lever 140 and the front tilt lever 150 raises the front glass 110 according to request to open the front glass 110, and the front sled 160 is moved to slidably move the front glass 110 to the upper end of the rear glass 120.

One end of each of the tilt levers 140 and 150 in accordance with the present disclosure is located on the rear surface of the front glass 110 and the other end of each of the tilt levers 140 and 150 is located on the rail assembly 130, so that, in order to open the front glass 110, the front glass 110 may be raised in the height direction of the vehicle.

The front sled 160 includes a first insert part 162 configured to be inserted into at least one side surface of the front sled 160 meeting the first guide rail 131, and a first carriage 161 configured to be integrally coupled with the front glass 110 is provided at the upper end of the front sled 160. Further, the front sled 160 includes a blocking part 163 provided at at least a part of the front sled 160 facing the front glass 110 to prevent dust from being introduced into the sunroof structure 100.

The rear sled 170 is located on the second guide rail 132, and includes second insert parts 172 configured to be inserted into one surface of the rear sled 170 facing the inner surface of the second guide rail 132, and a second carriage 171 configured to be coupled with the rear glass 120 so that the rear glass 120 is moved according to movement of the rear sled 170.

In one embodiment of the present disclosure, a driving motor to provide driving force to the front sled 160 and a driving motor to provide driving force to the rear sled 170 may be separately provided, or a single motor may be used to control movement of the front sled 160 and movement of the rear sled 170.

Figure 3A:
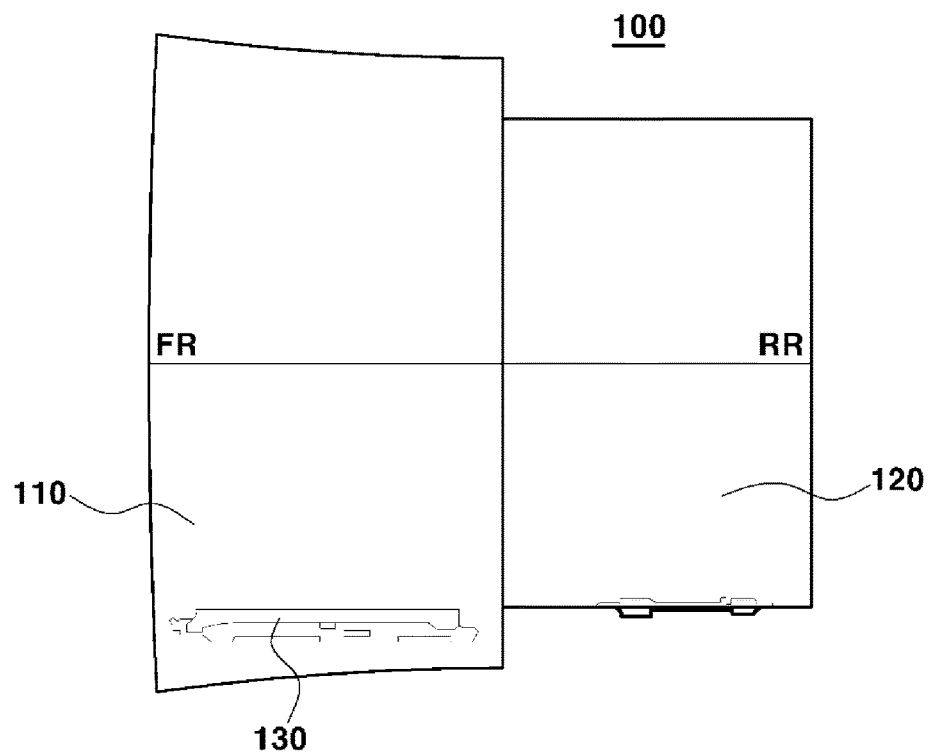
FIG. 3A is a front view of a bidirectionally open sunroof structure in accordance with one embodiment of the present disclosure in a closed state.
Figure 3B:
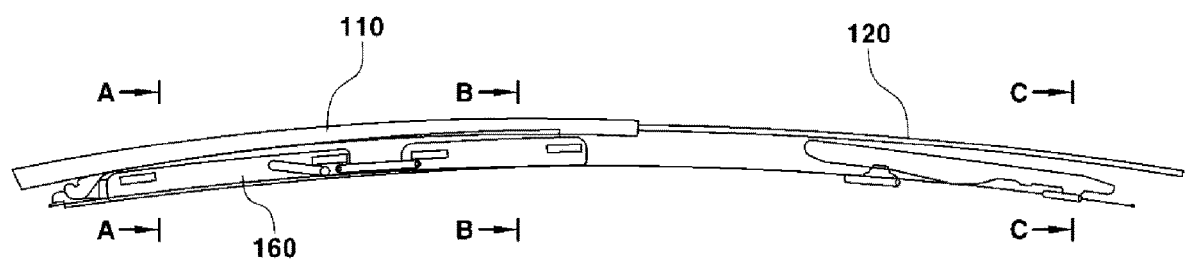
FIG. 3B is a side view of the bidirectionally open sunroof structure in accordance with one embodiment of the present disclosure in the closed state.
Figure 3C:
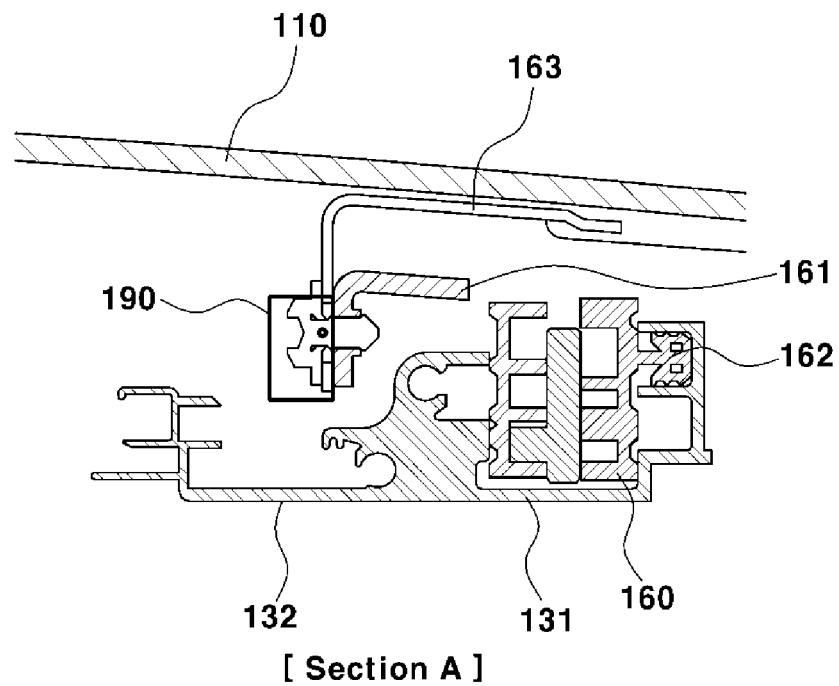
FIG. 3C is a cross-sectional view illustrating a cross section A of a front glass of the bidirectionally open sunroof structure in accordance with one embodiment of the present disclosure in the closed state.
Figure 3D:
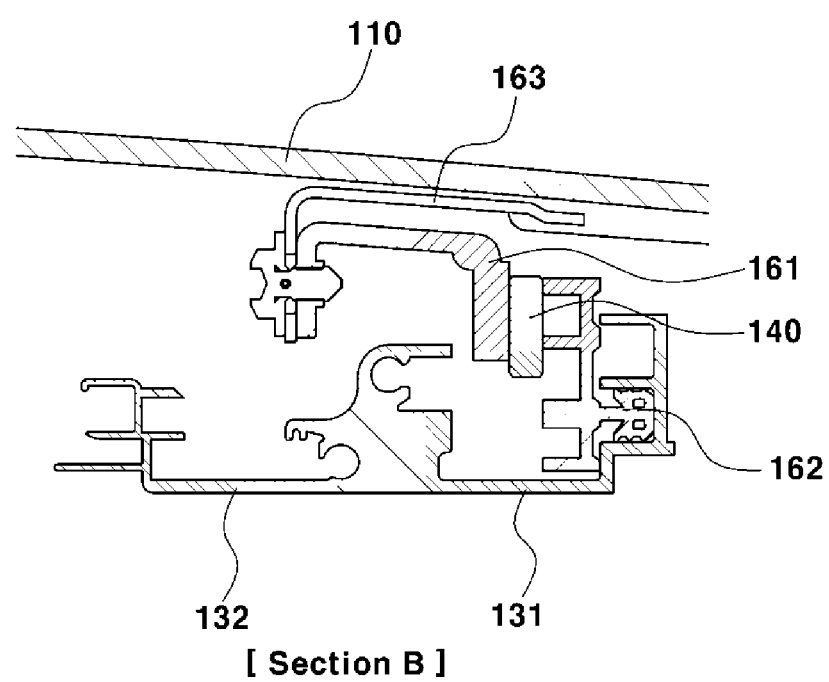
FIG. 3D is a cross-sectional view illustrating a cross section B of the front glass of the bidirectionally open sunroof structure in accordance with one embodiment of the present disclosure in the closed state.

FIG. 3C is a cross-sectional view illustrating a cross section A of the bidirectionally open sunroof structure 100 in the closed state, and FIG. 3D is a cross-sectional view illustrating a cross section B of the bidirectionally open sunroof structure 100 in the closed state.

As exemplarily shown in FIG. 3C, the first carriage 161 configured to be coupled with the front sled 160 is provided on the rear surface of the front glass 110, and the front sled 160 is located on the first guide rail 131.

Further, the blocking part 163 is located at least a part of the front sled 160 in the length direction close to the first carriage 161.

The second guide rail 132 is provided within the first guide rail 131 and thus the rail assembly 130 has a single structure including two different rails 131 and 132 arranged in the length direction.

The first guide rail 131 and the second guide rail 132 are divided through a central part 133, and FIG. 3C illustrates the cross section A of the front glass 110 including the front sled 160 located on the first guide rails 131.

Further, the rear tilt lever 140 in a lowered state is located to have the same height as the height of the front sled 160 and is configured to maintain the closed state of the front glass 110.

As exemplarily shown in FIG. 3C, a stopper 190 may be located at a front end of the front sled 160 in the length direction, and the stopper 190 may be configured to set a distance to perform front sliding movement of the rear sled 170 and a distance to perform rear sliding movement of the front sled 160.

Figure 3E:
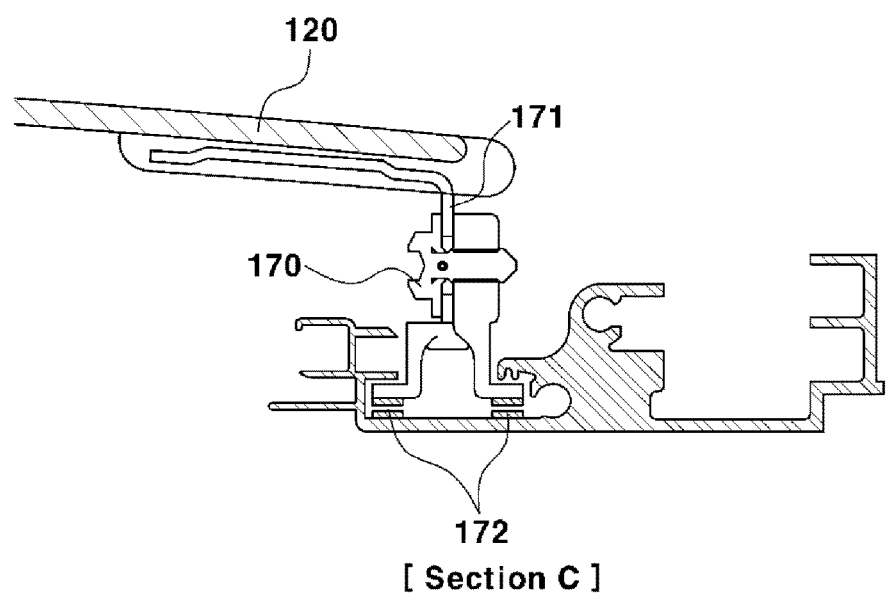
FIG. 3E is a cross-sectional view illustrating a cross section C of a rear glass of the bidirectionally open sunroof structure in accordance with one embodiment of the present disclosure in the closed state.

FIG. 3E illustrates a cross-section C representing combination relation between the rear glass 120 and the rear sled 170 in the closed state of the sunroof structure 100.

As exemplarily shown in this figure, the rear sled 170 includes the second insert parts 172 located on the second guide rail 132, and the second carriage 171 configured to be coupled with the rear glass 120, in the closed state of the sunroof structure 100. Further, the second guide rail 132 is configured to be located on the inner surface of the first guide rail 131 on which the front glass 110 is movable.

Figure 4:
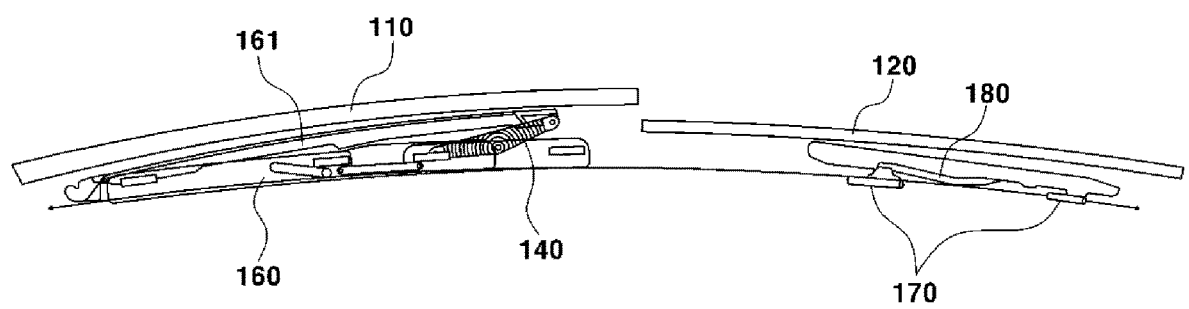
FIG. 4 is a side view of the bidirectionally open sunroof structure in accordance with one embodiment of the present disclosure in a tilted state of the front glass.

FIG. 4 is a side view of the bidirectionally open sunroof structure in accordance with one embodiment of the present disclosure in a state in which a rear part of the front glass 110 is raised (i.e., in a tilted state of the front glass 110).

As exemplarily shown in this figure, the rear tilt lever 140 is rotated to raise the rear surface of the front glass 110, and the front glass 110 may be tilted through the same driving motor to provide driving force to the front sled 160.

In contrast, in one embodiment of the present disclosure, the rear tilt lever 140 connected to the rear end of the front glass 110 may be rotated through a separate driving motor and, thus, the tilted state of the sunroof structure 100 may be maintained.

As described above, in the tilted state, the rear surface of the front glass 110 may be raised, the front tilt lever 150 may be maintained in parallel with the front sled 160, and the rear glass 120 may maintain the same position as in the closed state.

Figure 5A:
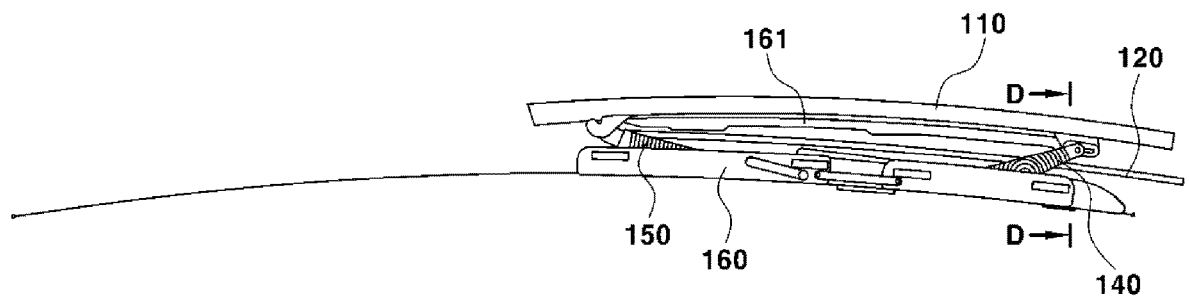
FIG. 5A is a side view of the bidirectionally open sunroof structure in accordance with one embodiment of the present disclosure in an open state of the front glass.

FIG. 5A is a side view illustrating combination relation between the elements of the bidirectionally open sunroof structure in accordance with one embodiment of the present disclosure in a completely open state of the front glass 110.

As exemplarily shown in this figure, in order to open the front glass 110, the front tilt lever 150 and the rear tilt lever 140 are simultaneously raised, and the front glass 110 is raised in the height direction of the vehicle to a height corresponding to the raised height of the front tilt lever 150 and the rear tilt lever 140.

Since the raised front glass 110 may be moved above the rear glass 120, the front sled 160 may move the front glass 110 to a position corresponding to the rear glass 120 along the first guide rail 131.

Further, since the rear glass 120 may maintain the same position as in the closed state of the sunroof structure 100, the front tilt lever 150 and the rear tilt lever 140 are raised in order to open the front glass 110, and the front glass 110 is open through sliding movement of the front sled 160. Therefore, the front glass 110 is converted into a front open state in which the front glass 110 is located above the rear glass 120.

Figure 5B:
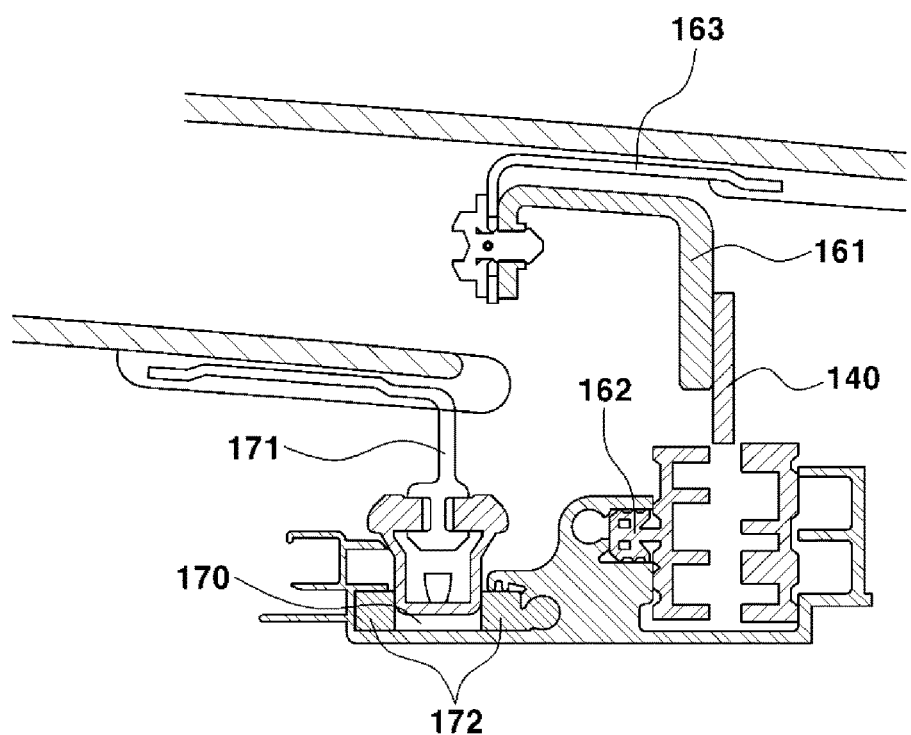
FIG. 5B is a cross-sectional view illustrating a cross section D of the bidirectionally open sunroof structure in accordance with one embodiment of the present disclosure in the open state of the front glass.

FIG. 5B is a cross-sectional view illustrating a cross section D of the bidirectionally open sunroof structure 100 in the front open state.

As exemplarily shown in this figure, the rear tilt lever 140 and the front tilt lever 150 are raised to a designated height, and the front glass 110 coupled with the tilt levers 140 and 150 has a predetermined height.

Further, the rear glass 120 is located to be spaced apart from the rear surface of the front glass 110, and the rear glass 120 maintains the same position as in the closed state of the sunroof structure 10 when the front glass 110 is open.

As such, in the open state of the front glass 110, the rear glass 120 maintains the same position as in the closed state of the sunroof structure 100, and the front glass 110 is moved in the height direction of the vehicle together with rise of the front tilt lever 150 and the rear tilt lever 140. Thereafter, the raised front glass 110 is moved toward the rear region of the vehicle along the upper surface of the rear glass 120.

Figure 6A:
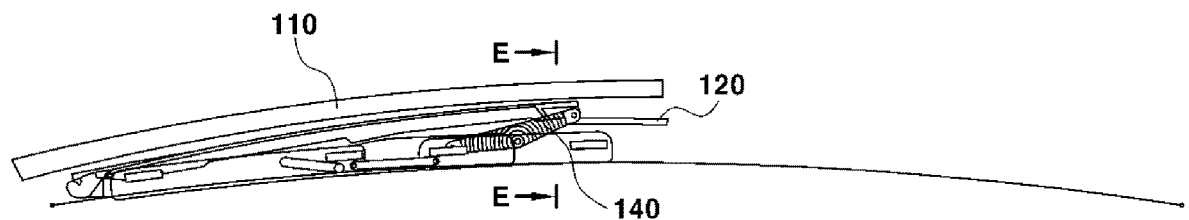
FIG. 6A is a side view of the bidirectionally open sunroof structure in accordance with one embodiment of the present disclosure in the open state of the rear glass.

FIG. 6A is a cross-sectional view of the bidirectionally open sunroof structure 100 in a rear open state. As exemplarily shown in this figure, the rear glass 120 is configured to be inserted into a region in which the front glass 110 is located to thus perform a rear open state.

In order to convert the rear glass 120 into the rear open state, the height of the rear glass 120 is reduced through a lowering lever 180 and simultaneously the front tilt lever 150 and the rear tilt lever 140 connected to the front glass 110 are raised.

Since the lowering lever 180 of the present disclosure may be configured to be interlocked with the rear sled 170, if the rear sled 170 to which driving force is applied is slidably moved to the front region of the vehicle, the lowering lever 10 may be coupled with the rear sled 170 and be rotated, and thus the rear glass 120 may be lowered in the height direction of the vehicle.

In one embodiment of the present disclosure, the front tilt lever 150 and the rear tilt lever 140 raised to convert the rear glass 120 into the rear open state may be raised to the same height as the height in the front open state and, in another embodiment of the present disclosure, the front tilt lever 150 and the rear tilt lever 140 connected to the front glass 110 may be raised so that the front glass 110 is raised to a height smaller than the height in the front open state.

In yet another embodiment, in order to convert the rear glass 120 into the rear open state, the rear tilt lever 140 may be raised and the front tilt lever 150 may be maintained in parallel with the front sled 160.

That is, in conversion into the rear open state, the front tilt lever 150 and the rear tilt lever 140 may be simultaneously or selectively raised so as to form a designated space, into which the rear glass 120 may be inserted, under the rear surface of the front glass 110.

After the front glass 110 is raised and the rear glass 120 is moved under the front glass 110, the rear glass 120 is moved to the front region of the vehicle along the rear sled 17 and thus reaches the rear open state. The rear glass 120 is inserted into the space under the front glass 110 to be spaced apart from the rear surface of the front glass 110 by a predetermined distance and, thus, a part of the sunroof structure 100 corresponding to a rear seat of the vehicle is open.

Figure 6B:
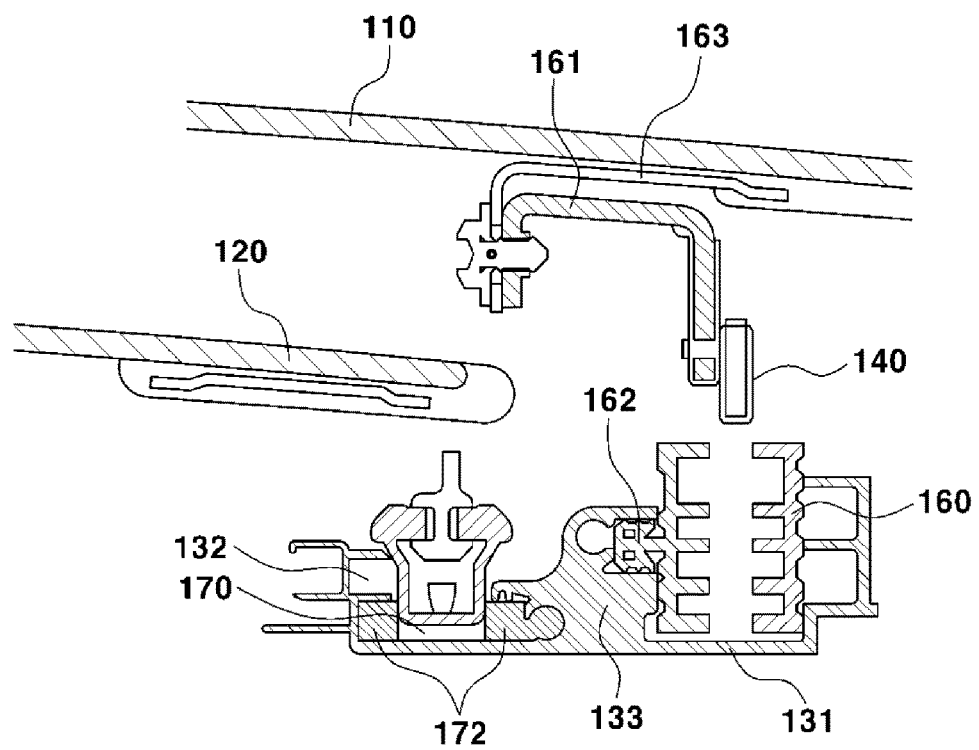
FIG. 6B is a cross-sectional view illustrating a cross section E of the bidirectionally open sunroof structure in accordance with one embodiment of the present disclosure in the open state of the rear glass.

FIG. 6B is a cross-sectional view illustrating a cross section E of the bidirectionally open sunroof structure in the rear open state and, as exemplarily shown in this figure, the rear tilt lever 140 connected to the front glass 110 is rotated at a designated angle so that the rear end of the front glass 110 is raised.

The rear glass 120 moving integrally with the rear sled 170 is inserted into the space under the raised front glass 110 and, in this case, the rear glass 120 is located so as not to generate interference between the rear sled 170 and the front sled 160.

In one embodiment of the present disclosure, in order to maintain the rear open state by inserting the rear glass 120 into the front glass 110, only the rear tilt lever 140 coupled with the front glass 110 may be raised, and the rear glass 120 lowered by rotation of the lowering lever 180 may be inserted into the space under the raised front glass 110.

In addition, in the rear open state of the present disclosure, the rear sled 170 contacts one end of the front sled 160, and the stopper 190 is provided at the contact part of the front sled 160 to prevent opening of the rear glass 120 exceeding the rear open state.

The stopper 190 may be provided at a position where the rear sled 170 and the front sled 160 meet when the front glass 110 is in the front open state, and be provided at a position where the rear sled 170 and the front sled 160 meet when the rear glass 120 is in the rear open state.

Particularly, the stopper 190 may be located on the front sled 160 so as to set sliding movement lengths of the front sled 160 and the rear sled 170, and perform a function of preventing movement of the front sled 160 or the rear sled 170 exceeding the set open state.

As is apparent from the above description, a bidirectionally open sunroof structure in accordance with the present disclosure may have the following effects by the above-described elements, and combination and using relations thereof.

The bidirectionally open sunroof structure in accordance with the present disclosure may open the rear glass and thus provide a sense of openness to passengers in a rear seat.

Further, the bidirectionally open sunroof structure in accordance with the present disclosure may provide a rail assembly structure having no interference between the front glass and the rear glass and thus have a durability enhancement effect.

While a number of exemplary aspects have been discussed above, those of skill in the art will recognize that still further modifications, permutations, additions and sub-combinations thereof of the disclosed features are still possible. It is therefore intended that the following appended claims and claims hereafter introduced are interpreted to include all such modifications, permutations, additions and sub-combinations as are within their true spirit and scope.

The invention claimed is:

1. A bidirectionally open sunroof structure comprising:
    rail assemblies installed at both sides of a roof panel of a vehicle;
    a front tilt lever connected to a front glass and the rail assembly and located at a front part of the front glass;
    a rear tilt lever connected to the front glass and the rail assembly and located at a rear part of the front glass;
    a front sled located on the front glass and driven by a driving motor to slidably reciprocate along the rail assemblies; and
    a rear sled located on a rear glass and driven by a driving motor to slidably reciprocate along the rail assemblies,
    wherein the rail assembly comprises:
    a first guide rail configured to slidably move the front sled therealong; and
    a second guide rail integrally formed with the first guide rail and configured to slidably move the rear sled therealong;
    wherein the rear glass is configured to be inserted underneath the front glass along the rear sled, and to be moved in a front and rear direction of the vehicle.

2. The bidirectionally open sunroof structure of claim 1, wherein, in order to move the front glass rearwards, the rear tilt lever and the front tilt lever raise the front glass.

3. The bidirectionally open sunroof structure of claim 1, further comprising a lowering lever configured to lower the rear glass, when the rear glass is moved forwards.

4. The bidirectionally open sunroof structure of claim 1, wherein the front sled comprises:
    a first insert part configured to be inserted into at least one side surface of the first guide rail;
    a first carriage configured to fix the front glass; and
    a blocking part configured to prevent dust from being introduced into the bidirectionally open sunroof structure.

5. The bidirectionally open sunroof structure of claim 1, wherein the rear sled comprises:
    second insert parts configured to be inserted into the second guide rail; and
    a second carriage configured to fix the rear glass.

* * * * *